United States Patent
Seetoo et al.

[11] 3,808,670
[45] May 7, 1974

[54] EXOTHERMIC BONDING OF THERMOELECTRIC COUPLES

[75] Inventors: Winston R. Seetoo; Roman K. Weide, both of Baltimore, Md.; Telesphore L. Charland, Fairfax, Va.

[73] Assignee: Isotopes, Inc., Westwood, N.J.

[22] Filed: May 24, 1972

[21] Appl. No.: 256,510

[52] U.S. Cl.................. 29/473.1, 29/498.5, 29/573
[51] Int. Cl............................................. B23k 31/02
[58] Field of Search................ 29/473.1, 498.5, 573; 228/56

[56] References Cited
UNITED STATES PATENTS

| | | | |
|---|---|---|---|
| 3,017,693 | 1/1962 | Hoba | 29/473.1 |
| 3,232,719 | 2/1966 | Ritchie | 29/573 |
| 3,395,445 | 8/1968 | Ovshinsky | 29/573 X |
| 3,400,452 | 9/1968 | Emley | 29/573 |
| 3,415,697 | 12/1968 | Bredzs et al. | 29/498.5 X |

Primary Examiner—J. Spencer Overholser
Assistant Examiner—Ronald J. Shore
Attorney, Agent, or Firm—Fleit, Gipple & Jacobson

[57] ABSTRACT

The present invention relates generally to metallurgical bonding methods for joining thermoelectric materials to themselves or to wrought metals and particularly to an exothermic bonding method wherein the bonding composition employed reacts to generate the thermal energy necessary to accomplish alloy bond formation. In one particular embodiment of the invention, elemental tin and tellurim are reacted "in situ" to form stoichiometric tin telluride or a nonstoichiometric tin telluride with an excess of tin, which composition acts under the exothermic conditions of the reaction to form bonds between the elements to be joined. Exothermic chemical reactions between any telluride-former, any selenide-former or any sulfide-former from Periods 4, 5 and 6 of the periodic table are applicable to bonding according to the present invention.

30 Claims, 5 Drawing Figures

EXOTHERMIC BONDING OF THERMOELECTRIC COUPLES

BACKGROUND AND SUMMARY OF THE INVENTION

The present invention provides a novel method for producing a high strength metallurgical bond characterized by low electrical resistance and minimum degradation when subjected to elevated temperatures or impressed power loads. In particular, the method of the present invention provides an exothermic bonding process wherein the bonding composition employed reacts to generate the thermal energy necessary to accomplish alloy bond formation. Thus, according to the present method, the bonding composition not only provides the material comprising the bond but also a substantial portion of the thermal energy necessary to produce the bond.

A typical thermoelectric couple consists of positive and negative-type alloy members known as "legs" bonded to suitable hot and cold "shoes" which themselves can be fabricated of semiconductor materials or wrought metals or suitable combinations thereof. The positive and negative alloy members or legs may themselves be segmented wherein the individual sgements comprising each leg may be joined metallurgically. Although it is desirable to produce a metallurgical bond between the various segments of the legs and between the legs and the hot and cold shoes, a direct metallurgical bond such as a diffusion bond cannot always be effected because of degradation of the elements of the couple at the high temperatures required to produce such bond. Prior art bonding with elemental tin wafers at 950°F for example produces a bond which degrades rapidly under generator conditions of 1,000° F at the hot junction and 200° F at the cold junction. The bonds degrade to the point where the legs become unbonded and separate from the shoes.

It is therefore an object of the present invention to provide a joining method wherein bond-energy is supplied to a thermocouple bonding site by the exothermic reaction of the bonding materials themselves.

It is another object of the invention to provide a process of forming the bond composition at the site of the bond.

It is a further object of the invention to provide a method for forming a direct reaction bond between elements, such as of a thermoelectric couple, without exceeding temperature limitations imposed by one or several of the components of this couple.

According to the present invention, exothermically reactive materials, particularly stoichiometric and non-stoichiometric mixtures of elemental tin and tellurium, are reacted to form metallurgical and chemical bonds between the various components of the couple. The bond is formed without temperature degradation of the components of the couple because the exothermically reacting mixture produces an elevated temperature only at the bonding site while the bulk temperature of the various components remains at a non-degrading lower lever. In the process thus described, formation of the tin telluride reaction produce occurs simultaneously with bonding of the segments, legs and shoes to each other or to the reaction product. The exothermic generation of heat provides the energy by which the metallurgical joining is effected.

The method of the present invention is particularly useful for applications where heat-degradable elements must be strongly bonded without elevating the bulk temperature of the elements to a point sufficient to melt or degrade the elements. The exothermically reacting compositions used in the practice of the present invention produce an intense heat flux, thereby providing the necessary temperature in the local area of the intended bond thereby causing the bond to form.

Bonding compositions useful with the present method include exothermically reactive mixtures of elements from Periods 4, 5 and 6 of the periodic table with tellurium, selenium or sulfur, particularly stoichiometric and nonstoichiometric mixtures of elemental tin and tellurium. As will be seen from the detailed description of the present invention the present method exhibits utility for bonding metallic, intermetallic, and ceramic components.

Particular use of the invention moreover is found in the technology of producing thermoelectric generators, particularly thermoelectric couples for such generators. These couples must be fabricated with bonds of acceptable metallurgical, thermal and electrical characteristics, that is, high strength, low electrical resistance, low thermal resistance and resistance to degradation of the bond structure.

DESCRIPTION OF THE PREFERRED EMBODIMENTS

The present invention provides a novel and effective solution to the problem of bonding together the various components of thermocouples which may be heat degradable at the temperatures required according to the prior art for direct reaction bonding processes. The present invention further provides a method whereby the heat of reaction of the bonding compositions provides the energy required to effect a suitable metallurgical bond between various components of a thermocouple assembly.

Figure 1:
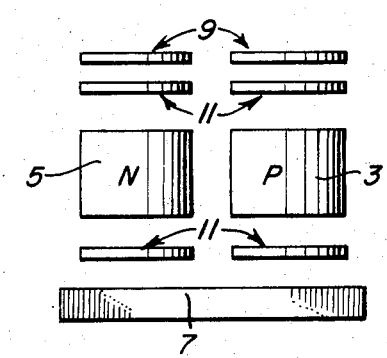
FIG. 1 is an exploded elevational view of an unsegmented thermoelectric couple bonded by prior art techniques, and using pure tin wafers.
Figure 2:
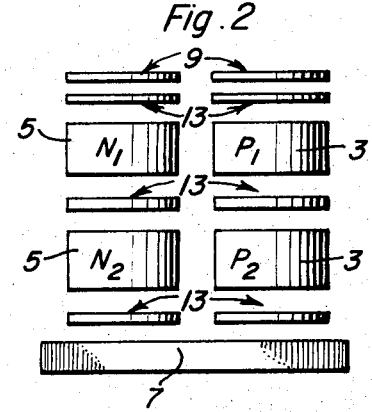
FIG. 2 is an exploded elevational view of a thermocouple having segmented p- and n- legs which are bonded together by the method of the present invention, using tin and tellurium wafers.
Figure 3:
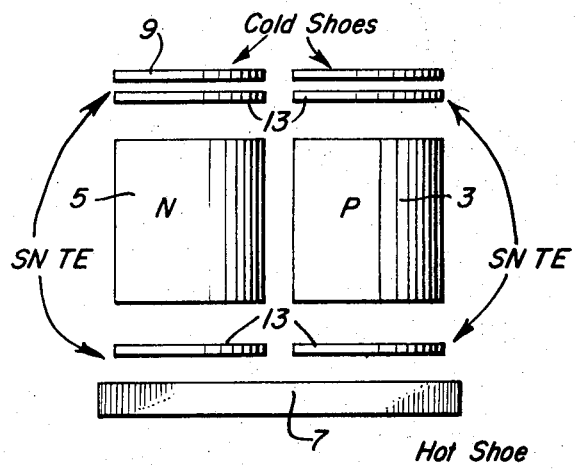
FIG. 3 is an exploded elevational view of a thermoelectric couple prior to assembly by means of the exothermic bonding material employed in the practice of the present invention, using tin and tellurium wafers.

The prior art bonding method is represented in FIG. 1. A metallurgical bond is formed between the shoes (7) and (9), the p-leg (3), and the n-leg (5) using a pure tin wafer (11). In the inventive method represented in FIG. 2, bonds are also formed between the shoes (7) and (9) and the n- and p- legs (5) and (3), respectively, however in this case the legs are segmented as shown in the $N_1$ and $N_2$ segments and $P_1$ and $P_2$ segments. Unlike the prior art method represented in FIG. 1, however, the FIG. 2 bonding is effected between the respective segments of the legs, as well as between the legs and shoes by using elemental tin and tellurium wafers (13). FIG. 3 depicts a $\pi$-shaped thermoelectric couple similar in structure to the couple of FIG. 1, however wafers (13) of elemental tin and tellurium are substituted for the pure tin wafers (11) of FIG. 1, the direct reaction bonds being formed by the exothermic reaction.

Both stoichiometric and nonstoichiometric mixtures of tin and tellurium may be used to form the tin telluride bond, according to the exothermic reaction of the present invention:

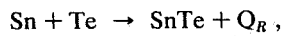

$$Sn + Te \rightarrow SnTe + Q_R,$$

where $Q_R$ represents the quantity of heat energy evolved from the exothermic reaction of tin with tellurium. For stoichiometric proportions of tin and tellurium, the above reaction is initiated at about 570° F. The exothermic heat of reaction acts to locally elevate the temperature of the ends of the legs (3) and (5) and of the bond surfaces of the shoes (7) and (9) so as to provide sufficient energy to produce the bonding therebetween without exceeding the bulk temperature limitations particularly imposed by the presence of heat-degradable thermoelectric components.

Figure 4:
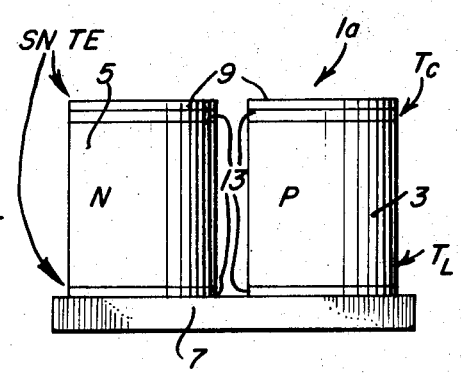
FIG. 4 is an elevational view of a thermoelectric couple during bonding by the present inventive method, indicating the several local temperatures existing in the couple during the bonding operation; and, FIG. 5 is a composite exploded and perspective view illustrative of the assembly operation used to fabricate a thermoelectric couple according to the practice of the present invention.

FIG. 4 depicts the inventive couple during exothermic bonding. The localized temperature, at the juncture of the hot shoe (7) with the p-leg (3) is indicated by $T_H$, and the localized temperature at the juncture of the cold shoe (9) with the p-leg (3) is indicated by $T_C$. Both temperatures $T_H$ and $T_C$ are substantially greater than the temperature $T_L$ of the thermocouple p-leg (3). Thus, the exothermicity of the tin-tellurium reaction allows formation of a satisfactory metallurgical bond without injury to the components. Bulk heating of the thermoelectric couple is not necessary to produce the desired bond, and hence the possibility of degrading heat sensitive elements of the couple is eliminated.

Figure 5:
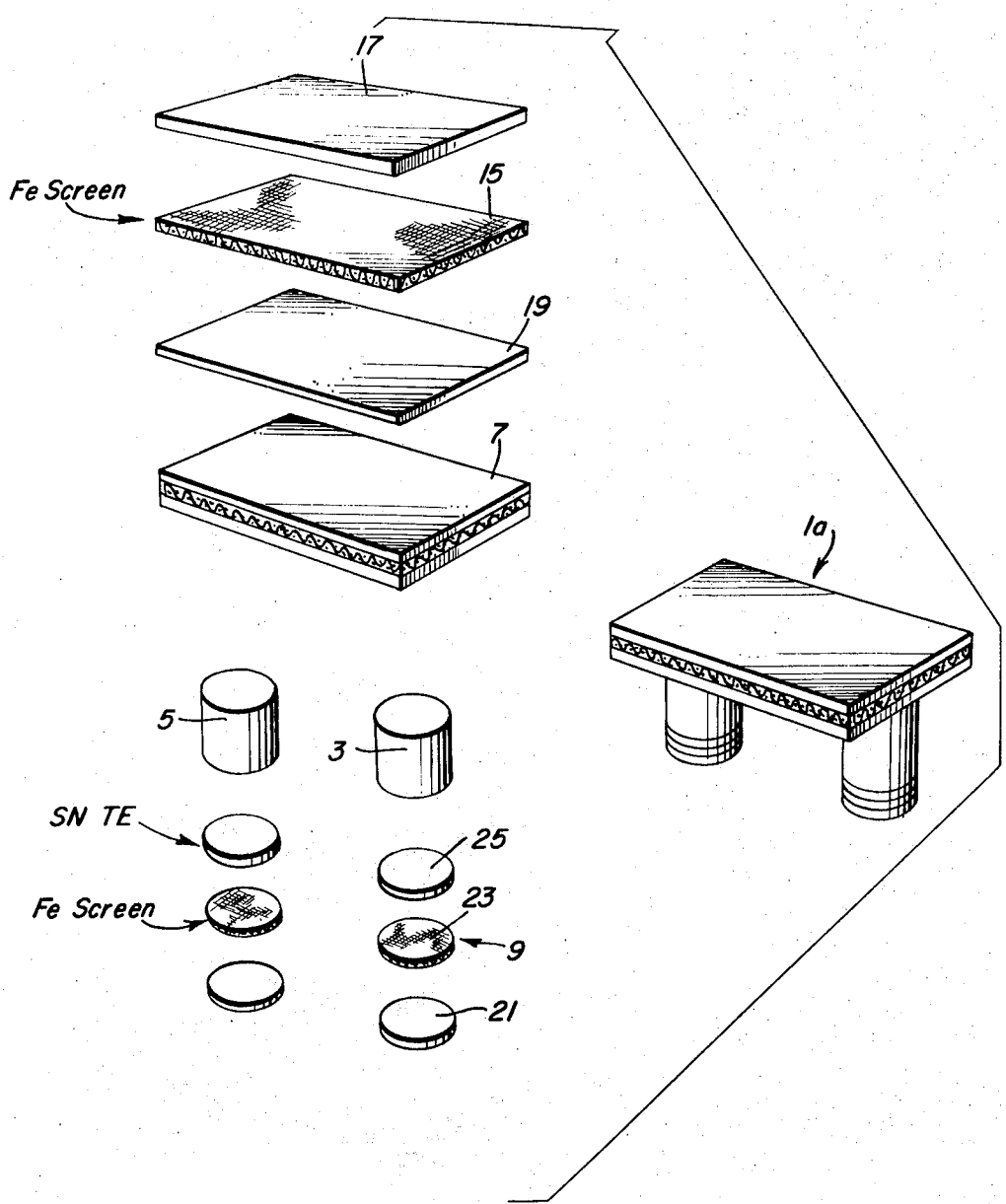

A specific instance of the present invention can be seen in the exploded and perspective assembly views of FIG. 5. Fabrication of the hot shoe (7) is accomplished by welding a 35-mesh elemental iron screen (15) to a standard "Ferro-Vac-E" iron hot shoe plate (17). A tin-tellurium pressed wafer (19) is melted (cast) onto the welded screen-plate assembly to form the hot shoe (7). The cold shoes (9) are formed by the welding of iron shoe plates (21) to 35-mesh iron screens (23) and the subsequent melting of tin-tellurium pressed wafers (25) onto the welded plate-screen assemblies. The p-leg (3) of the thermoelectric couple is formed from an alloy of silver, antimony, tellurium, and germanium known in the art as TAGS 85. The n-leg (5) of the couple is formed of lead telluride.

The elements described above and shown in FIG. 4 are bonded at the respective junctures between the legs (3) and (5) and the hot shoe (7), and between the legs (3) and (5) and the cold shoes (9) by use of a bellows bonding tool (not shown) well known in the art. Tin and tellurium wafers (13) are interposed at the respective junctures. Couple bonding parameters are typically 950° F ± 25° F, 40 psi, and a hydrogen atmosphere. Due to the exothermic nature of the tin-tellurium reaction, heating of the entire couple assembly need not be carried above 950° F, the exothermic reaction being initiated at 570° F and generating sufficient heat flux to accomplish the bonding at a localized temperature of at least 1,100° F. Therefore, the tin-tellurium reaction not only provides the formation of tin telluride alloy compositions with the materials of the shoes (7) and (9) and the legs (3) and (5), that is metallurgical and chemical bonds between these elements, but also provides the heat flux by which the bonding is accomplished.

The wafers (13), (19) and (25) are fabricated by blending, such as in a well-known V-shape blender and for a suitable period of time, a mixture of suitably pure elemental tin of a 30-mesh or finer particle size and suitably pure elemental tellurium pulverized to a 30-mesh or finer particle size. After blending, the mixture is weighed and cold pressed into the wafers (13), (19) and (25) of the required shape and weight, for example at 40 psi in a tool steel die. Alternatively, the coatings (19) and (25) may be cast directly onto the backing sheets (17) and (21), respectively, with the attached screens (15) and (23). stoichiometric or nonstoichiometric mixtures of tin and tellurium may be used to form the wafers (13), (19) and (25). Examples of two nonstoichiometric compositions are 50 percent by weight of tin and tellurium and 80 percent tin – 20 percent tellurium. Couples fabricated with the latter composition have displayed a total-couple resisance of 1.25 to 1.40 milliohms, a 7.4 percent decrease compared to prior art couples (the comparison being made with a couple of the same geometry and materials, save for the bond, and after a nominal, but short, operational period), and have displayed a power output of 1.40 watts for a hot shoe temperature of 1,015° F and a cold shoe temperature of 200° F, a 7.7 percent increase over prior art couples. Using the composition of 50 percent by weight each of tin and tellurium, couples have been fabricated which display somewhat higher resistance, 1.82 to 2.49 milliohms, and somewhat lower power output, .72 watts, compared to the 80 percent tin – 20 percent tellurium composition.

The present invention may be practiced equally well with cast, hot-pressed or cold-pressed and sintered couple elements, as well as with wrought metal shoes instead of the more complex shoes just described, and may be practiced at a variety of temperatures and pressures, in oxidizing, reducing, or inert atmospheres, or in vacuum. Various methods of heating, such as induction, resistance, or gas, and various methods of pressure application, such as mechanical, hydraulic, or gas, may be employed in the practice of the present invention.

The invention is not limited to the use of tin-tellurium compositions, the detailed description of the use of such compositions being given by way of example. To accomplish satisfactory bonding by the present method, certain exothermically reactive combinations of materials, compounds, or mixtures of compositions from Periods 4, 5 and 6 of the periodic table with Te, Se or S may be used. Mixtures of these materials which produce an exothermic reaction and which are compatible with thermoelectric elements and components and achieve satisfactory bonding are encompassed by the present invention. Specific examples of materials suitable to practice of the present method include Sn-Te, Pb-Te, Pb-Sn-Te, Bi-Te, Bi-Ge-Te, Ni-Sn-Te, Ag-Te, Sb-Te, Mn-Te, Fe-Te, and Ni-Te. The above-described materials may be either stoichiometric or nonstoichiometric mixtures.

As previously detailed, the exothermic bonding method described hereinabove is applicable to bonding various metallic, intermetallic, and ceramic components in technological fields other than the thermoelectric couple arts. The invention is therefore not limited to the particular application which is described above solely by way of example but is applicable to a variety of situations requiring high strength bonds preferably having low electrical and/or thermal resistance. The present method is particularly applicable to a bonding situation where a localized bonding temperature higher than the allowable bulk temperature must be obtained to accomplish the bond.

What is claimed is:

1. A method for fabricating thermoelectric couples consisting of positive and negative legs and hot and cold shoes which comprises forming a metallurgical and chemical bond between said legs and shoes by inserting between each of said legs and shoes a first material and second material and inducing an exothermic reaction to form a metallurgical and chemical bond; said first material being an element or composition of elements from Periods 4, 5, and 6 of the periodic table other than tellurium, selenium, or sulfur and said second material is selected from the group consisting of tellurium, selenium, or sulfur.

2. The method of claim 1 wherein said first material is an element selected from the group consisting of tin, lead, bismuth, germanium, silver, antimony, nickel, maganese, and iron; and said second material is tellurium.

3. The method of claim 1 wherein said legs are divided into segments which are also bonded together by said metallurgical and chemical bond.

4. The method of claim 1 wherein reaction is initiated by the introduction of heat energy sufficient to cause exothermic reaction of said materials.

5. The method of claim 4 and further comprising the step of applying pressure to the thermoelectric couple to facilitate bonding of the legs to the shoes.

6. The method of claim 1 wherein said first material and said second material are applied between the legs and shoes in the form of pressed wafers.

7. The method of claim 1 wherein said first material and said second material are present in the form of a wafer of an exothermically reacting powder mixture.

8. The method of claim 7 wherein the exothermically reacting mixture comprises a mixture of elemental tin and elemental tellurium.

9. The method of claim 8 wherein tin and tellurium are present in the mixture in stoichiometric proportions.

10. The method of claim 8 wherein the ratio by weight of tin to tellurium is 4:1, or 1:1, or 3:2, or other appropriate ratio in which the Te, Se or S is deficient in the atomic ratio compared to the other component.

11. The method of claim 1 wherein the positive-type leg is comprised of an alloy of silver, antimony, tellurium and germanium, the negative-type leg is comprised of lead telluride, and the hot and cold shoes are coated with tin telluride.

12. The method of claim 10 wherein the negative-type leg is comprised of cold-pressed-and-sintered, cast, or hot-pressed lead telluride.

13. A method for securing together at least two solids independently made from metallic, inter-metallic, or ceramic compounds comprising placing between the solids to be joined, a first material being an element or a compound of an element from Periods 4, 5 and 6 of the Periodic Table other than tellurium, selenium or sulphur and a second material selected from the group consisting of tellurium, selenium and sulphur, said first and second materials capable of exothermically reacting together, and inducing an exothermic reaction between said first material and said second material sufficient to form a metallurgical and chemical bond between the solids to be joined, said exothermic reaction not producing a temperature which is sufficiently high to degrade the body of the solids joined together by said metallurgical and chemical bond.

14. The method of claim 13 wherein said first material is an element or a conbination of elements selected from the group consisting of tin, lead, bismuth, germanium, silver, antimony, nickel, manganese, and iron; and said second material is tellurium.

15. A method according to claim 13 wherein said first material and said second material are present in the form of a mixture.

16. The method according to claim 15 wherein said first material and said second material are present in stoichiometric proportions.

17. The method of claim 15 wherein said first material is in particulate form of 30 mesh or finer and said second material is in particulate form of 30 mesh or finer, said particles being intermixed together.

18. The process according to claim 17 wherein said first material is elemental tellurium and said second material is elemental tin.

19. The process of claim 18 wherein said first material and said second material comprise stoichiometric proportions of tellurium and tin.

20. The process according to claim 18 wherein said mixture contains 50 to 80 percent by weight tin and 50 to 20 percent by weight tellurium.

21. The process according to claim 17 wherein the particle mixture is formed into a wafer and said wafer is inserted between said solids before said exothermic reaction is induced.

22. The process according to claim 21 wherein said solids are subjected to pressure through said exothermic reaction to facilitate bonding.

23. The process according to claim 17 wherein said mixture is directly coated onto at least one of said solids before said exothermic chemical reaction is induced.

24. The process according to claim 13 wherein said first material and said second material are combined in a mixture which comprises Sn-Te, Pb-Te, Pb-Sn-Te, Bi-Te, Bi-Ge-Te, Ni-Sn-Te, Ag-Te, Sb-Te, Mn-Te, Fe-Te, or Ni-Te.

25. The process according to claim 24 wherein the chemical elements in said mixture are present in stoichiometric proportions.

26. The process of claim 13 where said exothermic reaction is induced by heating, said first and second materials undergoing said exothermic reaction only after reaching a predetermined temperature.

27. The process of claim 13 wherein said solids are subjected to pressure during said exothermic reaction in order to facilitate bonding.

28. The process of claim 13 wherein at least one of said solids is made from a thermoelectric material.

29. The process of claim 28 wherein both said solids are made from thermoelectric materials.

30. The process of claim 28 wherein at least one of said solids is a thermoelectric shoe.

* * * * *